US008625551B2

(12) United States Patent
Dutta et al.

(10) Patent No.: US 8,625,551 B2
(45) Date of Patent: Jan. 7, 2014

(54) FLEXIBLE MOBILITY FRAMEWORK FOR HETEROGENEOUS ROAMING IN NEXT GENERATION WIRELESS NETWORKS

(75) Inventors: Ashutosh Dutta, Bridgewater, NJ (US);
Subir Das, Belle Mead, NJ (US);
Fuchun Joe Lin, Morris Plains, NJ (US); Dana Chee, Maplewood, NJ (US);
Tsumehiko Chiba, Saitama (JP);
Hidetoshi Yokota, Minuma (JP); Akira Idoue, Tada (JP)

(73) Assignees: Telcordia Technologies, Inc.,
Piscataway, NJ (US); KDDI Corporation, Tokyo (JP)

( * ) Notice: Subject to any disclaimer, the term of this patent is extended or adjusted under 35 U.S.C. 154(b) by 762 days.

(21) Appl. No.: 12/004,580

(22) Filed: Dec. 21, 2007

(65) Prior Publication Data
US 2008/0176560 A1    Jul. 24, 2008

Related U.S. Application Data

(60) Provisional application No. 60/876,765, filed on Dec. 22, 2006, provisional application No. 60/930,412, filed on May 16, 2007.

(51) Int. Cl.
*H04Q 7/20* (2006.01)

(52) U.S. Cl.
USPC ........................................................ 370/338

(58) Field of Classification Search
USPC ........................................................ 370/338
See application file for complete search history.

(56) References Cited

U.S. PATENT DOCUMENTS

| | | | |
|---|---|---|---|
| 2002/0052965 A1 | 5/2002 | Dowling | |
| 2004/0137888 A1* | 7/2004 | Ohki | 455/417 |
| 2004/0162892 A1* | 8/2004 | Hsu | 709/221 |
| 2005/0243766 A1 | 11/2005 | Tsirtsis | |
| 2006/0018273 A1 | 1/2006 | Yamada et al. | |
| 2006/0018291 A1 | 1/2006 | Patel et al. | |
| 2006/0020787 A1 | 1/2006 | Choyi et al. | |
| 2006/0165060 A1 | 7/2006 | Dua | |

FOREIGN PATENT DOCUMENTS

EP    0111872 A1    6/1984

OTHER PUBLICATIONS

Kolbehdari, Session Initiation Protocol (SIP) Evolution in Converged Communications, Feb. 15, 2006, 10 Pages.*
International Search Report, dated May 7, 2008 (2 pages).
Supplementary European Search Report dated Nov. 4, 2010, 1 page.

* cited by examiner

*Primary Examiner* — Sulaiman Nooristany
(74) *Attorney, Agent, or Firm* — Philip J. Feig (57) ABSTRACT

A system and method for mobility support of a mobile node having a home network in a heterogeneous roaming environment is presented. The method comprises the steps of authenticating the mobile node in a visited network and obtaining an address for the mobile node in the visited network, establishing a security connection between a functional component in the visited network and an agent in the home network, creating a home address for the mobile node, and using the home address to generate a SIP signaling address, a SIP media address, and a non-SIP media address, such that SIP non-media is transmitted using the security connection to the SIP signaling address, SIP media is transmitted using the security connection to the SIP media address, and non-SIP media is transmitted using the security connection to the non-SIP media address.

16 Claims, 5 Drawing Sheets

FLEXIBLE MOBILITY FRAMEWORK FOR HETEROGENEOUS ROAMING IN NEXT GENERATION WIRELESS NETWORKS

CROSS REFERENCE TO RELATED APPLICATION

The present invention claims the benefit of U.S. provisional patent application 60/876,765 filed Dec. 22, 2006, and of U.S. provisional patent application 60/930,412 filed May 16, 2007, the entire contents and disclosures of which are incorporated herein by reference.

FIELD OF THE INVENTION

The present invention relates generally to next generation wireless networks, and more specifically to a framework for heterogeneous roaming of mobile nodes in such networks.

BACKGROUND OF THE INVENTION

Ubiquitous roaming support for real-time traffic, such as interactive VoIP, streaming, and the non-real-time data transfer of FTP and e-mail in an access independent manner, is becoming increasingly important. For example, the evolution of the mobility protocols of Mobile IPv4 (MIPv4) and Mobile IPv6 (MIPv6) has made it easier to support ubiquitous roaming. Carriers in the wireless Internet have different mobility capabilities, and mobile clients may also have a variety of mobility capabilities. For example, some operators or carriers may support mobile assisted mobility protocol, such as MIPv6 and Client Mobile IPv6 (CMIPv6), while others may support network assisted mobile protocol, such as Proxy Mobile IPv6 (PMIPv6). In some cases, often the mobile assisted mobility protocols, a mobile node or mobile client may be equipped with a mobility stack, and the mobile node may use an application layer mobility protocol in certain situations.

In a typical roaming environment, two domains can belong to two separate carriers with different mobility support and security and authentication procedures. Accordingly, a mobile node in the Next Generation Wireless Networks may be subjected to roaming that may involve different kinds of movement scenarios. These movement types can be confined to home domain or visited domain. When the mobile node is away from home and is in the visited domain, the mobile node is defined to be in roaming mode. When in the roaming mode, the mobile node can move between two sub-networks that may belong to the same carrier domain, or it can move from one carrier domain to another carrier domain. Any mobile node in roaming scenario may be subjected to several degrees of heterogeneity, such as types of mobility being supported in the network elements and in the mobile node's stack, the type of application supported in the mobile node and type of movement both in the local domain or in the visited domain that might involve changing bearer manager. Also, while in the visited domain, avoiding exposure of a subscriber's permanent IP address in the visited carrier networks is important to maintain security.

Several existing standards bodies are attempting to define the core network architecture for next generation wireless networks. Third Generation Partnership Project (3GPP) defined an IP Multimedia Subsystem (IMS) architecture, and 3GPP2 defined the Multimedia Domain (MMD) architecture. Recently, Advances to IMS (A-IMS) architecture, which enhances existing IMS and MMD networks, has been proposed to support a variety of services such as Session Initiation Protocol (SIP)-based and non-SIP-based applications. SIP-based applications are typically set up by SIP and provide services such as VoIP. On the other hand, non-SIP-based applications provide services such as IPTV and FTP without using SIP. Similarly, International Telecommunication Union Telecommunication Standardization Sector (ITU-T) is working on defining the Next Generation Network (NGN) under the premises of a Global Standards Initiative, i.e. NGN-GSI. All these architectures include heterogeneous access networks, such as CDMA, WiMAX, and 802.11 technologies, and include support for roaming.

At present, however, the inventors know of no flexible framework that can support seamless mobility between networks with different mobility support.

The following abbreviations are used throughout.
3GPP: Third Generation Partnership Project
AAA: Authentication, Authorization and Accounting
AGW: Access GateWays
AN: Access Network
AS: Application Servers
CDMA: Code Division Multiple Access
CMIPv6: Client Mobile IPv6
CN: Correspondent Node
DAD: Duplicate Address Detection
DHCP: Dynamic Host Configuration Protocol
FTP: File Transfer Protocol
GGSN: Gateway GPRS Support Node
GSM: Global System for Mobile communications
HA: Home Agent
hHoA: Home Address of node in home domain
I-CSCF: Interrogating Call Session Control Function
IETF: Internet Engineering Task Force
IMS: IP Multimedia Subsystem
IMS/MMD—combination of IMS and MMD
IPTV: Internet Protocol TeleVision
ITU-T: International Telecommunication Union Telecommunication Standardization Sector
LCP: Link Control Protocol
LMA: Local Mobility Anchor
LTE: Long Term Evolution
MAG: Mobile Access Gateway
MIPv4: Mobile IPv4
MIPv6: Mobile IPv6
MMD: Multimedia Domain
MN: Mobile Node
NAI: Network Access Identifier
NGN: Next Generation Network
NGN-GSI: Next Generation Network-Global Standards Initiative
PCF: Packet Control Function
P-CSCF—Proxy Call Session Control Function
PDSN—Packet Data Serving Node
PMA: Proxy Mobile Agents
PMIPv6: Proxy Mobile IPv6
PPP: Point to Point Protocol
SAE: System Architecture Evolution
S-CSCF—Serving Call Session Control Function
SDP: Session Description Protocol
SIP: Session Initiation Protocol
URI: Universal Resource Identifier
vHoA: Home Address of node in visited domain
VoIP: Voice over IP
WiMAX: IEEE 802.16 wireless specification

BRIEF SUMMARY OF THE INVENTION

The present invention advantageously provides a solution to the problems of mobility management, that is, roaming and service continuity, in next generation wireless networks. This invention benefits different types of roaming, such as home local, visited local, global mobility and combinations thereof, as well as Simple IP, CMIPv6 and PMIPv6 mobility operation, and also addresses heterogeneity of application, e.g., SIP, non-SIP based, being supported on a mobile node. A combination of application layer, network layer and local mobility protocol can be used based on the mobile's movement pattern, the mobile's and the network's mobility capability, and the type of application being supported. The solution provides a framework useful for supporting inter-carrier roaming involving global and local mobility between domains and within domains.

In one embodiment, a system and method for mobility support of a mobile node having a home network in a heterogeneous roaming environment, includes a method comprising the steps of authenticating the mobile node in a visited network and obtaining an address for the mobile node in the visited network, establishing a security connection between a functional component in the visited network and an agent in the home network, creating a home address for the mobile node, and using the home address to generate an SIP signaling address, an SIP media address, and a non-SIP media address, such that SIP non-media is transmitted using the security connection to the SIP signaling address, SIP media is transmitted using the security connection to the SIP media address, and non-SIP media is transmitted using the security connection to the non-SIP media address.

In another embodiment, the method comprises the steps of authenticating the mobile node in a visited network and obtaining an address for the mobile node in the visited network, establishing more than one security connection between a functional component in the visited network and an agent in the home network, creating a home address for the mobile node, and using the home address to generate a SIP signaling address for SIP, a SIP media address for SIP media, and a non-SIP media address for non-SIP media, such that SIP signaling is transmitted using one of the security connections to the SIP media address, SIP media is transmitted using another of the security connections to the SIP media address, and non-SIP media is transmitted using yet another of the security connections to the non-SIP media address.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

An inventive solution to the problem of mobility management in next generation wireless networks is presented. This solution is a framework for supporting inter-carrier roaming involving global and local mobility between domains and within domains. When a mobile node changes its network point of attachment, traffic is disrupted due to the handover process, which can be mobile-node-controlled or network-controlled. Depending on the type of movement, mobility can be handled at the link layer, the network layer, or the application layer. Link layer mobility is access specific, so that it cannot solve the problem of heterogeneity and therefore is not discussed.

In network layer mobility, mobility involves heterogeneous access technologies, and can be controlled either by the mobile node or the network. In a mobile-controlled scenario of network layer mobility, the mobile node is usually equipped with a mobility stack and interacts with a remote entity such as a Home Agent (HA). An example of mobile-node-controlled mobility is CMIPv6. In the network layer mobility, when the mobility protocol is network-controlled, other networking elements in the middle of the network interact with the remote entity, typically an HA, and perform handoff related functions.

Figure 1:
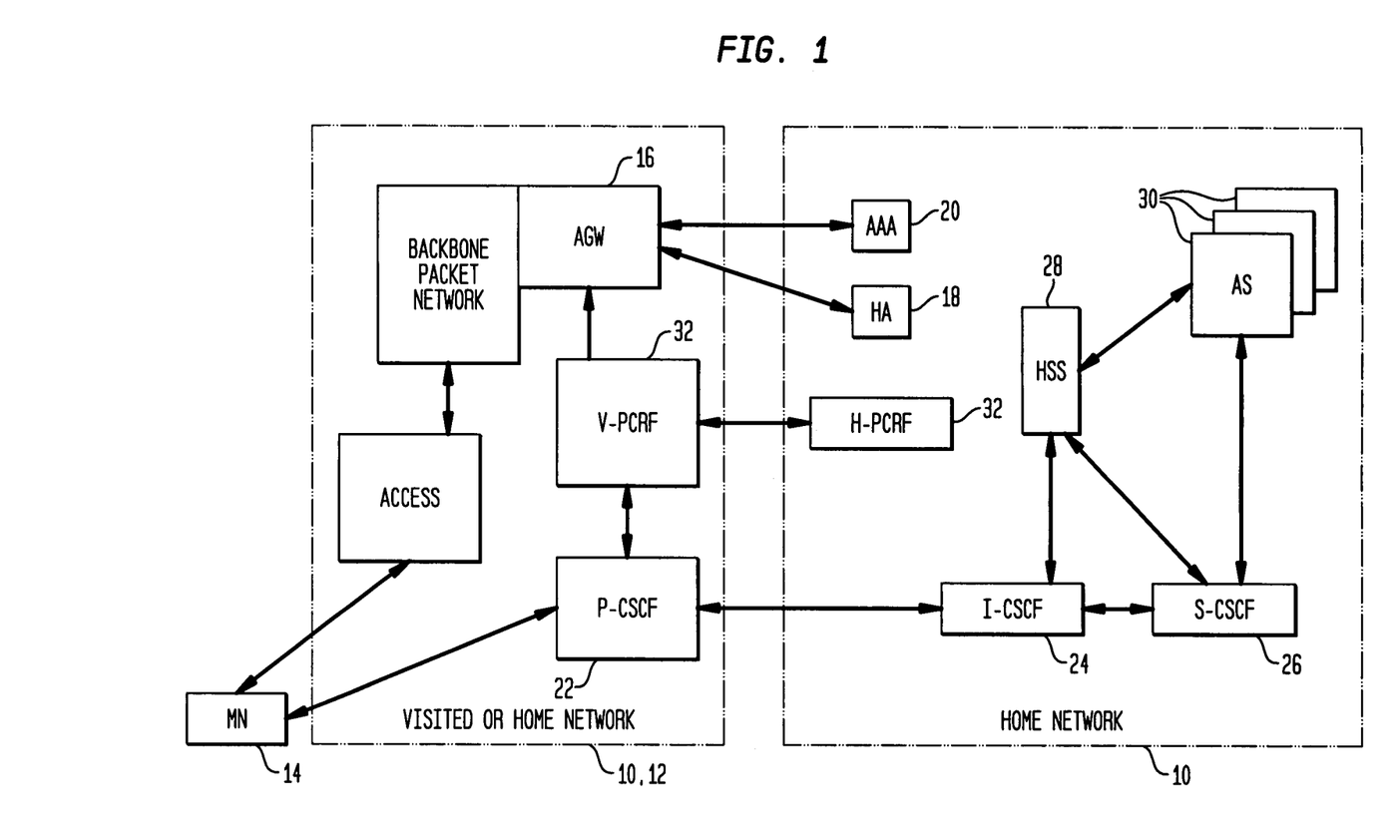
FIG. 1 illustrates generic network architecture for next generation wireless networks.

FIG. 1 illustrates the functional components of generic network architecture for next generation wireless networks for providing ubiquitous services that need mobility support along with quality of service, security and charging. This generic network comprises a home network 10 and a visited network 12, which can also be considered another home network. In addition, it includes IP core entities of MN or mobile node 14, access gateways (AGW) 16, home agents (HA) 18, and authentication, authorization and accounting (AAA) 20. It also has IMS/MMD entities of Proxy Call Session Control Function (P-CSCF) 22, Interrogating Call Session Control Function (I-CSCF) 24, Serving Call Session Control Function (S-CSCF) 26, home subscriber service (HSS) 28, application server (AS) 30 and policy and charging rules function (PCRF) 32. Details of these functions components are as follows.

Home agent or entity HA 18 provides media packet transfer in the home domain or network 10 as Home Agent (hHA), and in the visited domain or network 12 as Visited Home Agent (vHA). The HAs 18 map the home addresses with the temporary care-of-addresses, and route the media and signaling messages to the mobile node 14.

SIP servers or entities, such as S-CSCF 26 and P-CSCF 22, take care of routing SIP signaling messages from and to the mobile node 14. S-CSCF 26 is always located in the home network 10 and assists with user or MN 14 registration regardless of the user location. In MMD network, either the P-CSCF 22 located in the home network 10 or the P-CSCF 22 in the visited network 12 can be used for registration. Dynamic Host Configuration Protocol (DHCP) servers (not shown) in each network help assign the P-CSCF 22 address to the mobile node 14.

AAA 20 servers in both the home network 10 and visited network 12 are used for user profile verification. However, each of the visited networks 12 and the home network 10 can have different mobility capabilities and requirements depending on the verification policy defined by the individual network operators.

In addition, there are both SIP-based and non-SIP-based ASs 30 that are responsible for providing advanced multimedia services beyond voice over internet protocol (VoIP). PCRF 32 controls the media based on the policy in each home and/or visited network 10, 12, and helps to provide feature interaction between SIP-based and non-SIP-based services. Depending on the type of access network, e.g., CDMA, 802.11, etc., the architecture can have AGWs 16 that may act as Gateway GPRS Support Node (GGSN), Packet Data Serving Node (PDSN) or Packet Data Interworking Function (PDIF).

Home local mobility is a scenario in which the mobile node 14 moves between two different access routers within a home domain 10. A similar type of movement in the visited domain 12 is called visited local mobility. Correspondingly, there can be several types of global mobility. The first form of global mobility occurs when the mobile node 14 moves from its home network 10 to the visited domain 12 of a new carrier network. The second form of global mobility involves the mobile node 14 moving from one visited domain 12 to another visited domain 12 within the same carrier network. The third form of global mobility happens when the mobile node 14 moves from one carrier network to another carrier network while away from the home domain 10.

Table 1 shows the possible combination of movement patterns that involve different types of mobility support in the home domain 10 and in the visited domain 12. The mobile node's stack can have either Simple IP or CMIPv6, and can move from the home domain 10 to the visited domain 12, where the home domain 10 and the visited domain 12 may offer different mobility support. The grey areas are situations that are unlikely to happen.

| Mobility stack on mobile node | Home Domain | Visited Domain |
|---|---|---|
| Simple IPv6 | Simple IPv6 | Simple IPv6 |
|  |  | PMIPv6 |
|  |  | CMIPv6 |
|  | PMIPv6 | Simple IPv6 |
|  |  | PMIPv6 |
|  |  | CMIPv6 |
|  | CMIPv6 | Simple IPv6 |
|  |  | PMIPv6 |
|  |  | CMIPv6 |
| CMIPv6 | Simple IPv6 | Simple IPv6 |
|  |  | PMIPv6 |
|  |  | CMIPv6 |
|  | PMIPv6 | Simple IPv6 |
|  |  | PMIPv6 |
|  |  | CMIPv6 |
|  | CMIPv6 | Simple IPv6 |
|  |  | PMIPv6 |
|  |  | CMIPv6 |

In order to reduce the load on the mobile node 14 and handle local mobility, the Internet Engineering Task Force (IETF) has been developing network-based localized mobility management protocols. These protocols are designed to take care of local mobility and are controlled by the network elements in the access routers. One such protocol is PMIPv6, which does not use any mobility stack on the mobile node 14 but rather uses functions or proxies on the access routers to help perform the mobility functions, such as the binding update to the HA 18. These functions or functional components are called Mobile Access Gateway (MAG) and can co-locate with the access routers. As long as the mobile node 14 moves within the same domain that has MAGs, the mobile node 14 assumes that it is in a home link. The MAG is responsible for sending the proper mobile prefix as part of the router advertisement for stateless auto-configuration, or it can also act as a DHCP relay agent for stateful auto-configuration.

Figure 2:
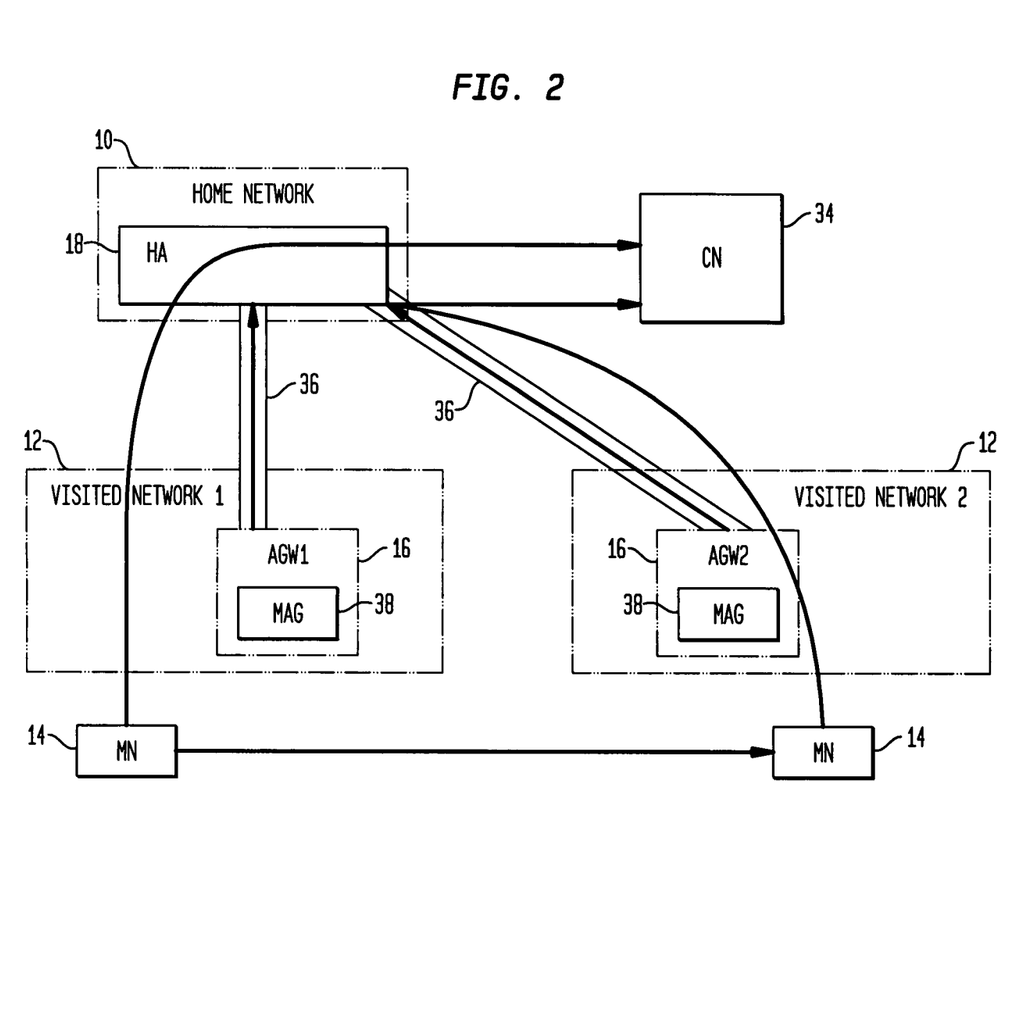
FIG. 2 illustrates network elements associated with PMIPv6.

FIG. 2 describes the network elements associated with PMIPv6 operation, and illustrates mobile node 14 handoff from visited network 1 12 to visited network 2 12. The mobile node 14 is in communication with a correspondent node (CN) 34. AGW1 16 and AGW2 16 each include a mobile proxy or MAG 38, and each has a tunnel 36 with HA 18.

After the mobile node 14 connects to the new point-of-attachment as part of the initial bootstrapping process or after the movement to a new domain, access is authenticated with the designated AAA 20 server. During this process, MAG 38 sends the binding update to the HA 18 with the address of the MAG 38 that is specific to the home prefix of the mobile node 14. In the absence of a pre-existing tunnel, this process helps to set up a tunnel 36 between the HA 18 and the respective MAG 38. The mobile node 14 configures its address using the prefix included in the router advertisement and interface-id, which can be assigned by MAG 38 or created by itself. The PMIPv6-based mobility protocol is preferred when mobility is confined within a domain and wireless service providers do not want to overload the mobile node's stack by setting up a tunnel 36 between the mobile node 14 and the HA 18. A tunnel is not desirable on the mobile node 14 because it adds extra processing and bandwidth constraints to the wireless hop.

Figure 3:
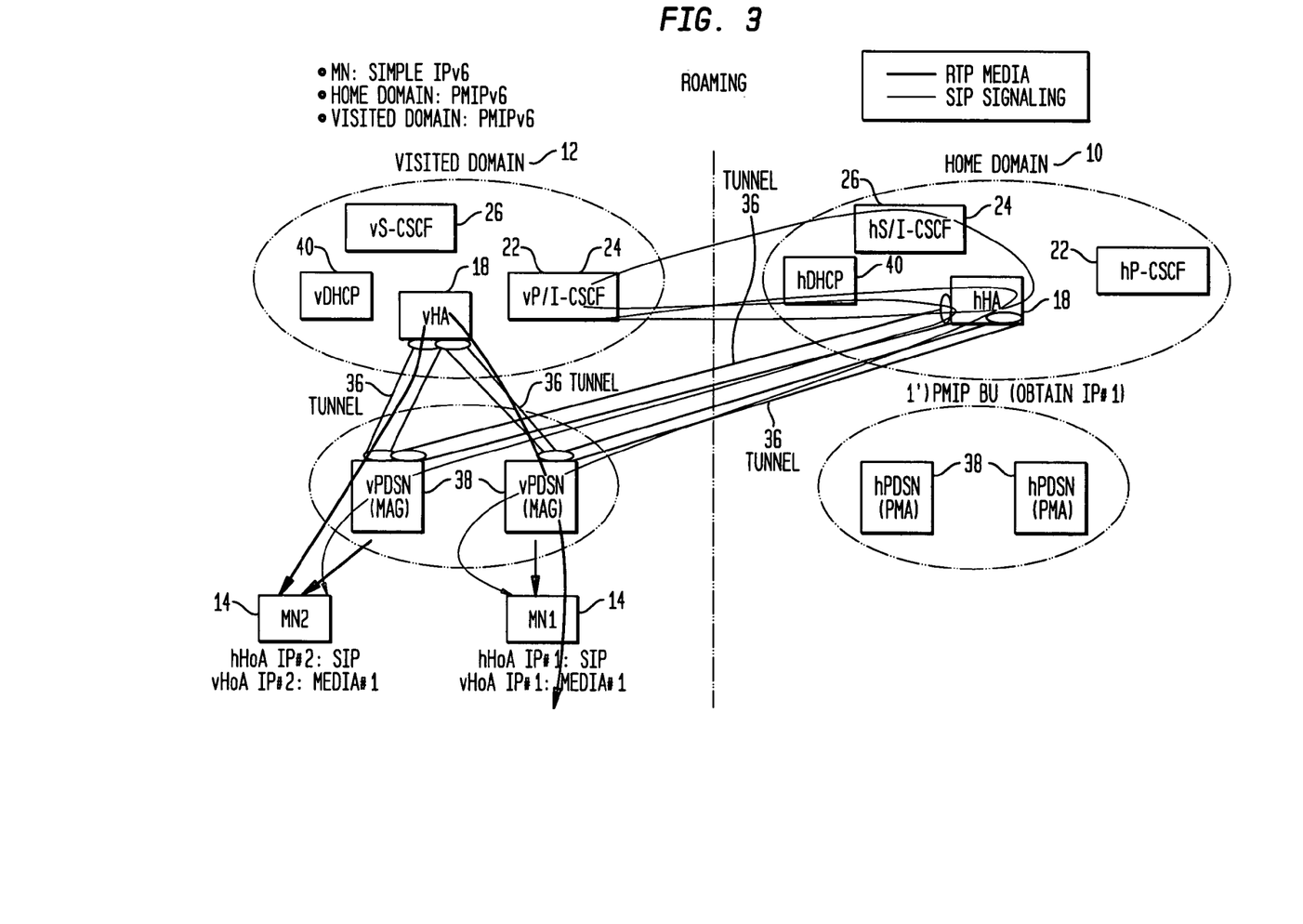
FIG. 3 illustrates roaming in one embodiment of the invention.

FIG. 3 illustrates roaming according to one embodiment of the invention. A home domain 10 includes entities or functional components of hP-CSCF 22, hS-CSCF 26, hI-CSCF 24, hHA 18 and hDHCP 40. In addition, the home domain 10 includes hPDSN routers each having a proxy mobile agent 38. The visited domain 12 includes entities of vP-CSCF 22, vS-CSCF 26, vI-CSCF 24, vHA 18 and vDHCP 40. The visited domain 12 also includes vPDSN routers, each having a mobile agent gateway 38. MN1 14 and MN2 14 are in visited domain 12. A tunnel 36 is established between each MAG 38 and hHA 18 in the home domain 10. Tunnels 36 are also created between each MAG 38 and vHA 18 in the visited domain 12. During session enablement, when the end nodes are notified of the signaling address and Session Description Protocol (SDP) address, media and signaling splitting is performed. The tunnels 36 carry the split traffic, so that SIP signaling is transmitted over one tunnel, and media for SIP as well as non-SIP application is sent over another tunnel. Each application specific media uses different contact address for transport.

Figure 4:
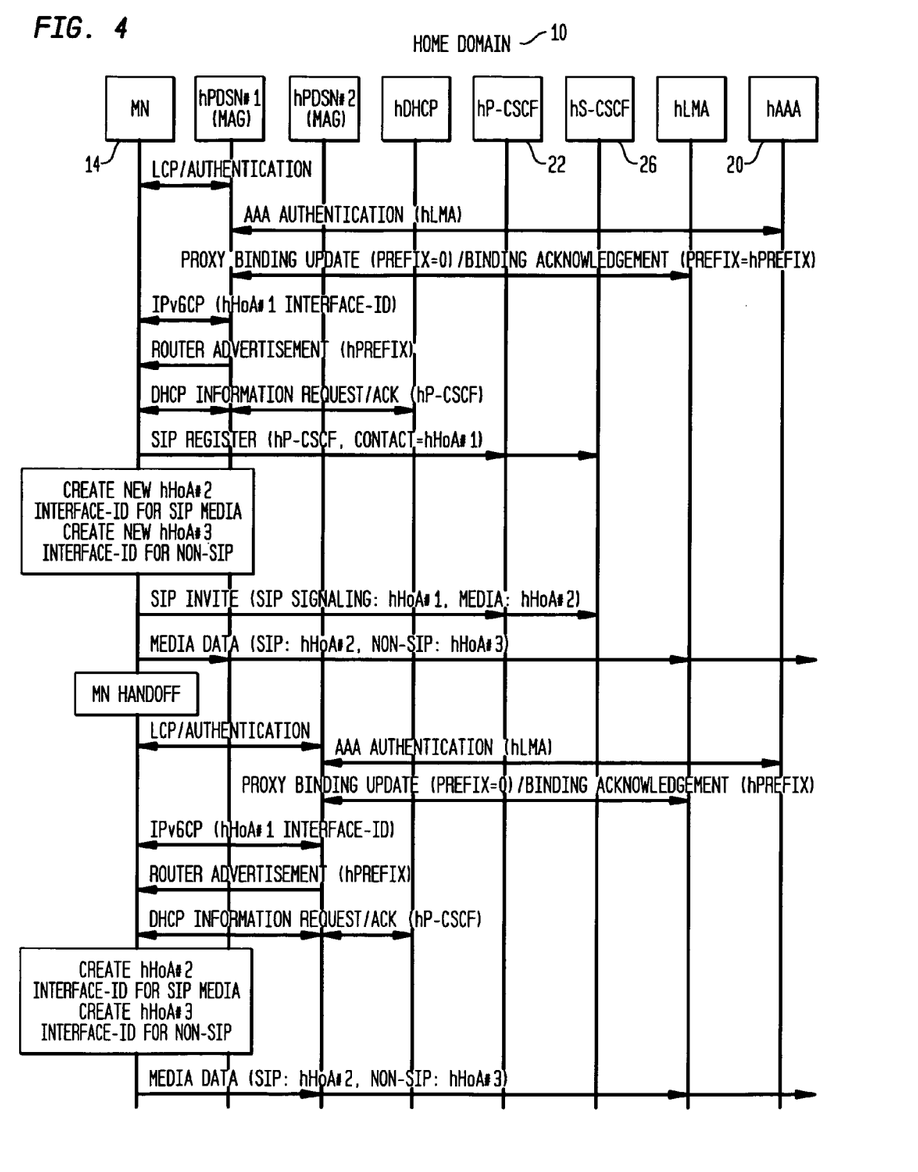
FIG. 4 illustrates a flow of home local mobility.

FIG. 4 shows the case of home local mobility when the mobile node 14 has a Simple IP stack, and the home network 10 is equipped with PMIPv6. Generic network architecture having access routers that behave as 3GPP2 PDSN are assumed, and a Local Mobility Anchor (LMA) serves as HA 18. As the mobile node 14 initially bootstraps in PDSN#1, it goes through an access authentication phase. With a Point-to-Point Protocol (PPP) link, access authentication takes place at the lower layer during the Link Control Protocol (LCP) and authentication phase. Since the PDSNs are equipped with MAG 38, the Network Access Identifier (NAI) is passed to the LMA 18 as part of the binding update, during which a tunnel 36 is created between MAG 38 and LMA 18. MAG 38 may also receive the home prefix and the interface-id for the specific mobile node 14 from the LMA 18. These are used for creating the hHoA#1 address.

The mobile node 14 interacts with the DHCP server to obtain the address of the P-CSCF 22. It then sends a SIP registration to the P-CSCF 22, and the P-CSCF 22 sends this registration to S-CSCF 26. Since hHoA#1 is used for the purpose of SIP signaling, the mobile node 14 uses the HoA's prefix and locally generated random interface-id to generate the new media addresses, hHoA#2 and hHoA#3, for SIP-based and non-SIP-based traffic, respectively. The mobile node 14 uses hHoA#2 as the media contact address in its SDP when the mobile node 14 invites another user or correspondent node 34. Consequently, the mobile node 14 receives media for the SIP-based application using a different IP address than for SIP signaling.

Since there is already a tunnel 36 established between the MAG 38 and LMA 18, any SIP signaling traffic destined for hHoA#1, SIP media destined for hHoA#2, and non-SIP media destined for hHoA#3 are tunneled via the PMIPv6 tunnel 36 setup between the MAG 38 and LMA 18. In one embodiment (not shown), separate tunnels are established for each of SIP signaling traffic, SIP media and non-SIP media. In all cases, even if the mobile node 14 moves to a new PDSN#2, and hence changes to a new MAG 38, hHoA#1, hHoA#2, and hHoA#3 do not change.

Figure 5:
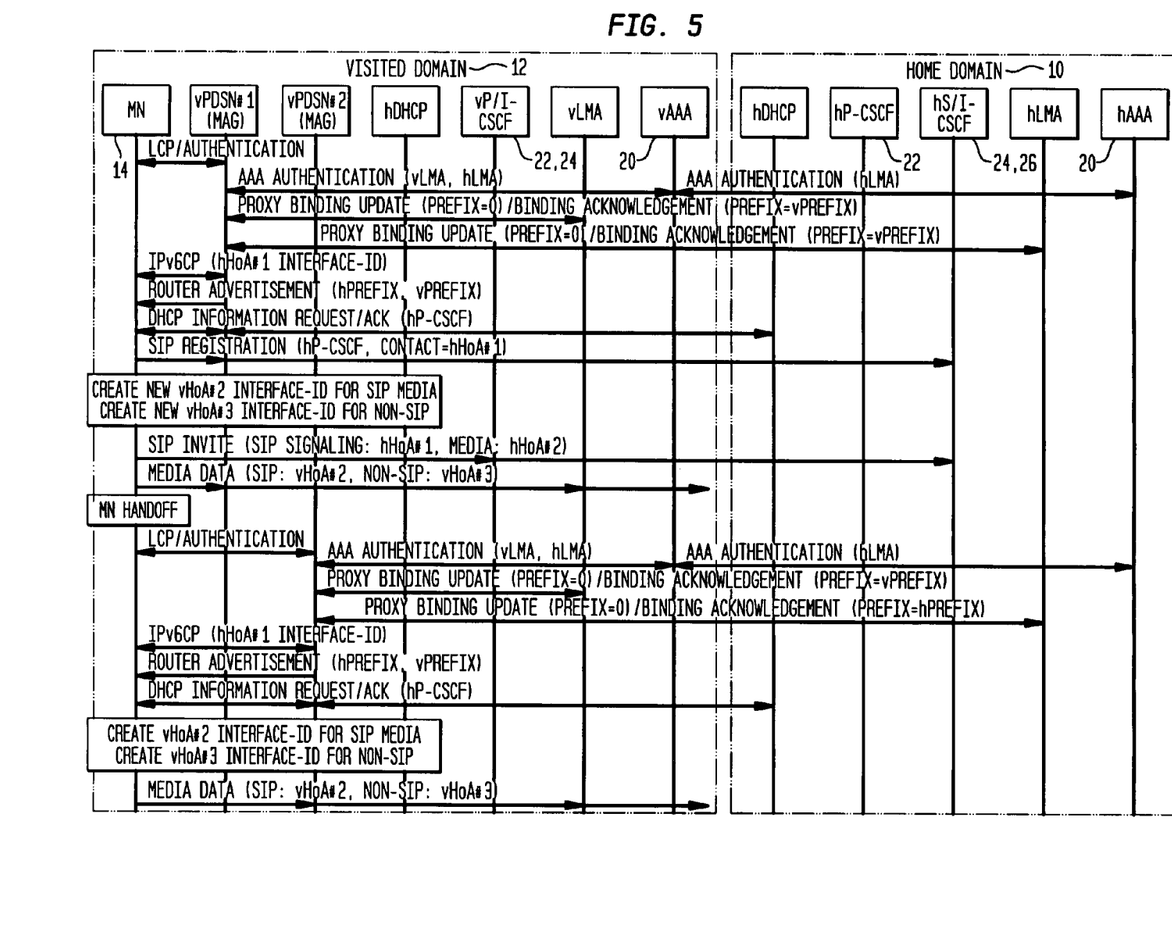
FIG. 5 illustrates a flow of mobility with home and visited domains.

FIG. 5 shows the flows for the case in which the mobile node 14 has a Simple IP stack, and both the home domain 10 and visited domain 12 support PMIPv6. As in FIG. 3, LMA serves as a form of HA 18. The first time the mobile node 14 moves to the visited domain 12, access is authenticated along with the PMIPv6 binding update procedure with MAG 38. During the access authentication, the MAG 38 sends two binding update messages to two LMAs 18. One binding update message is sent to the visited LMA 18 and the other is sent to the home LMA 18 according to the authentication response message from the visited AAA 20 and home AAA 20. MAG 38 sends the interface-id during the IPv6CP procedure, and sends both the vHoA's prefix and hHoA's prefix as part of the router advertisement message. Based upon these three parameters, the mobile node 14 generates hHoA#1 used for SIP signaling, and vHoA#2 used for media packets. The mobile node 14 then obtains the address of home P-CSCF 22 from the home DHCP server through the PMIPv6 tunnel 36 between the MAG 38 and home LMA 18, and sends SIP registration to the home P-CSCF 22. The home P-CSCF 22 forwards it to home S-CSCF 26 to update the user information. After a successful SIP signaling setup, the mobile node 14 receives traffic using the vHoA#1 address. In order to send the non-SIP media packets, the mobile node 14 creates vHoA#3 using a self-generated interface-id and vHoA's prefix. During handoff, the mobile node 14 obtains the same prefixes from the visited LMA 18 and home LMA 18. Therefore, the mobile node 14 does not have to send an SIP registration message unless the assigned P-CSCF 22 changes.

While the present invention has been described in particular embodiments, it should be appreciated that the present invention should not be construed as limited by such embodiments, but rather construed according to the claims below.

What is claimed is:

1. A method for mobility support of a mobile node having a home network in a heterogeneous roaming environment, said method performed on a processor comprising the steps of:
authenticating the mobile node in a visited network and obtaining an address for the mobile node in the visited network;
establishing a security connection between a functional component in the visited network and an agent in the home network;
creating a home address for the mobile node during SIP registration comprising a prefix and an interface-id; and
generating, using the home address, a SIP signaling address, a SIP media address, and a non-SIP media address;
wherein SIP signaling is transmitted using the security connection to the SIP signaling address, SIP media is transmitted using the security connection to the SIP media address, and non-SIP media is transmitted using the security connection to the non-SIP media address and when the mobile node moves to another visited network, the generated SIP signaling address, the generated SIP media address, and the generated non-SIP media address continue to be used, wherein the another visited network is one of a new carrier or the visited network and the another visited network are within the same carrier network where the another visited network is other than the authenticating visited network, or the mobile node moves from one carrier network to another carrier network while away from the home domain.

2. The method according to claim 1, wherein the home address for the mobile node is obtained from a functional component of an access router in the visited network.

3. The method according to claim 1, wherein the security connection is established over a tunnel.

4. The method according to claim 1, wherein the functional component is a mobile proxy and the agent is a local mobility anchor.

5. A method for mobility support of a mobile node having a home network in a heterogeneous roaming environment, said method performed on a processor comprising the steps of:
authenticating the mobile node in a visited network and obtaining an address for the mobile node in the visited network;
establishing more than one security connection between a functional component in the visited network and an agent in the home network;
creating a home address for the mobile node during SIP registration comprising a prefix and an interface-id; and
generating a SIP signaling address for SIP, a SIP media address for SIP media, and a non-SIP media address for non-SIP media using the home address;
wherein SIP signaling is transmitted using a first of the security connections to the SIP media address, SIP media is transmitted using a second of the security connections to the SIP media address and non-SIP media is transmitted using a third of the security connections to the non-SIP media address and when the mobile node moves to another visited network, the generated SIP signaling address, the generated SIP media address, and the generated non-SIP media address continue to be used, wherein the another visited network is one of a new carrier or the visited network and the another visited network are within the same carrier network where the another visited network is other than the authenticating visited network, or the mobile node moves from one carrier network to another carrier network while away from the home domain.

6. The method according to claim 5, wherein the home address for the mobile node is obtained from a functional component of an access router in the visited network in cooperation with the agent in the home network.

7. The method according to claim 5, wherein the security connection is established over a tunnel.

8. The method according to claim 5, wherein the functional component is a mobile proxy and the agent is a local mobility anchor.

9. A system for mobility support of a mobile node having a home network in a heterogeneous roaming environment, said system performed on a processor comprising:
a visited network authenticating the mobile node and determining an address for the mobile node;
a security connection between a functional component in the visited network and an agent in the home network;
a home address for the mobile node created during SIP registration comprising a prefix and an interface-id;
a SIP signaling address generated using the home address;

a SIP media address generated using the home address; and
a non-SIP media address generated using the home address,
wherein SIP signaling is transmitted using the security connection to the SIP signaling address, SIP media is transmitted using the security connection to the SIP media address, and non-SIP media is transmitted using the security connection to the non-SIP media address and when the mobile node moves to another visited network, the generated SIP signaling address, the generated SIP media address, and the generated non-SIP media address continue to be used, wherein the another visited network is one of a new carrier or the visited network and the another visited network are within the same carrier network where the another visited network is other than the authenticating visited network, or the mobile node moves from one carrier network to another carrier network while away from the home domain.

10. The system according to claim 9, wherein the home address for the mobile node is obtained from a functional component of an access router in the visited network.

11. The system according to claim 9, wherein the security connection is a tunnel.

12. The system according to claim 9, wherein the functional component is a mobile proxy and the agent is a local mobility anchor.

13. A system for mobility support of a mobile node having a home network in a heterogeneous roaming environment, said system performed on a processor comprising:
a visited network authenticating the mobile node and determining an address for the mobile node;
a plurality of security connections between a functional component in the visited network and an agent in the home network;
a home address for the mobile node generated during SIP registration comprising a prefix and an interface-id;
a SIP signaling address generated using the home address;
a SIP media address generated using the home address; and
a non-SIP media address generated using the home address,
wherein SIP signaling is transmitted using a first of the plurality of security connections to the SIP signaling address, SIP media is transmitted using a second of the plurality of security connections to the SIP media address, and non-SIP media is transmitted using a third of the plurality of security connection to the non-SIP media address and when the mobile node moves to another visited network, the generated SIP signaling address, the generated SIP media address, and the generated non-SIP media address continue to be used wherein the another visited network is one of a new carrier or the visited network and the another visited network are within the same network carrier network where the another visited network is other than the authenticating visited network, or the mobile node moves from one carrier network to another carrier network while away from the home domain.

14. The system according to claim 13, wherein the home address for the mobile node is obtained from a functional component of an access router in the visited network.

15. The system according to claim 13, wherein the security connection is a tunnel.

16. The system according to claim 13, wherein the functional component is a mobile proxy and the agent is a local mobility anchor.

* * * * *

UNITED STATES PATENT AND TRADEMARK OFFICE
CERTIFICATE OF CORRECTION

| | | |
|---|---|---|
| PATENT NO. | : 8,625,551 B2 | Page 1 of 1 |
| APPLICATION NO. | : 12/004580 | |
| DATED | : January 7, 2014 | |
| INVENTOR(S) | : Dutta et al. | |

It is certified that error appears in the above-identified patent and that said Letters Patent is hereby corrected as shown below:

On the Title Page, Item (75), under "Inventors", in Column 1, Line 7, delete "Tada" and insert -- Toda --, therefor.

Signed and Sealed this
Seventh Day of April, 2015

Michelle K. Lee
*Director of the United States Patent and Trademark Office*